United States Patent
Kawase et al.

(10) Patent No.: US 8,187,506 B2
(45) Date of Patent: May 29, 2012

(54) BARIUM TITANATE-BASED SEMICONDUCTOR CERAMIC COMPOSITION AND BARIUM TITANATE-BASED SEMICONDUCTOR CERAMIC DEVICE

(75) Inventors: Yoichi Kawase, Nagaokakyo (JP);
Syunsuke Okuda, Nagaokakyo (JP);
Yuichi Hirata, Nagaokakyo (JP);
Yasuhiro Nabika, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/303,436

(22) Filed: Nov. 23, 2011

(65) Prior Publication Data

US 2012/0068127 A1 Mar. 22, 2012

Related U.S. Application Data

(63) Continuation of application No. PCT/JP2010/059432, filed on Jun. 3, 2010.

(30) Foreign Application Priority Data

Jun. 5, 2009 (JP) .................................. 2009-135757

(51) Int. Cl.
| | |
|---|---|
| H01B 1/08 | (2006.01) |
| H01B 3/12 | (2006.01) |
| C04B 35/46 | (2006.01) |
| H01C 7/02 | (2006.01) |

(52) U.S. Cl. .................................. 252/520.21; 501/136
(58) Field of Classification Search ............. 252/520.21, 252/521.1, 521.3; 423/263, 598; 501/136
See application file for complete search history.

(56) References Cited

U.S. PATENT DOCUMENTS

| 5,030,386 | A | * | 7/1991 | Saxton et al. | ............ 252/520.21 |
| 5,686,367 | A | * | 11/1997 | Hayashi | ........................ 501/137 |
| 2003/0022784 | A1 | * | 1/2003 | Kawamoto et al. | ........... 501/137 |

FOREIGN PATENT DOCUMENTS

| JP | 51-38091 A | 3/1976 |
| JP | 7-220902 A | 8/1995 |
| JP | 2007-246328 A | 9/2007 |
| JP | 2008-210907 A | 9/2008 |

OTHER PUBLICATIONS

Written Opinion of the International Searching Authority, mailed Aug. 31, 2010.

* cited by examiner

*Primary Examiner* — Mark Kopec
(74) *Attorney, Agent, or Firm* — Dickstein Shapiro LLP

(57) ABSTRACT

A barium titanate-based semiconductor ceramic composition which can be used for PTC thermistors for temperature sensors and which has characteristics, including a linear characteristic, advantageous for such PTC thermistors and a barium titanate-based semiconductor ceramic device. The barium titanate-based semiconductor ceramic composition is represented by the formula $(Ba_{(1-v-w)}Me_vSr_w)Ti_xO_3+ySiO_2$, wherein Me is at least one of Er, Sm, Ce, and La, $0.001 \leq v \leq 0.005$, $0.42 \leq w \leq 0.49$, $0.99 \leq x \leq 1.03$, and $0.002 \leq y \leq 0.030$.

16 Claims, 1 Drawing Sheet

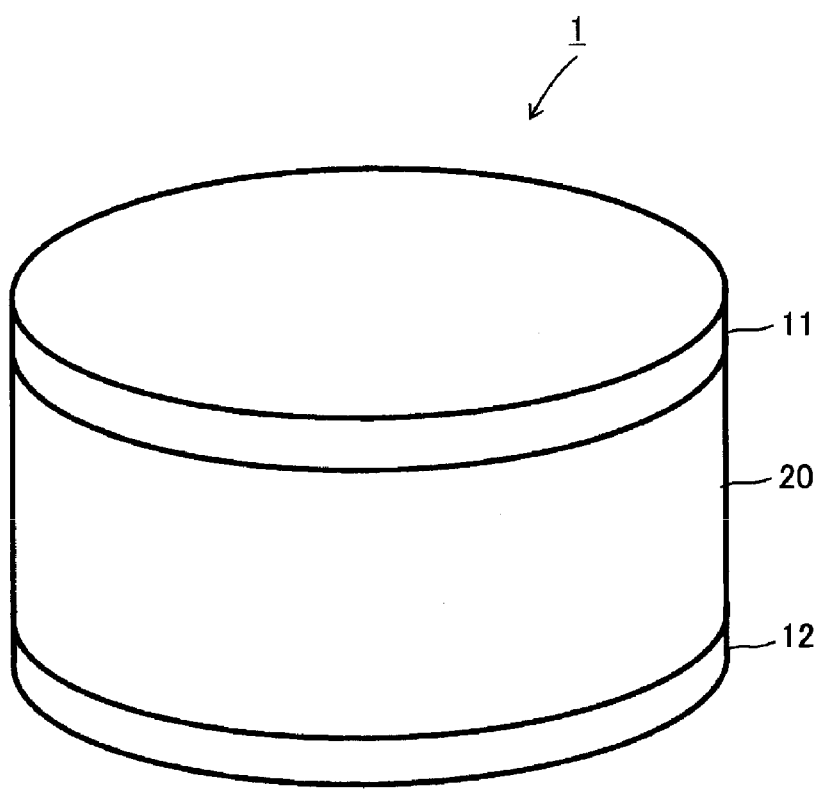

BARIUM TITANATE-BASED SEMICONDUCTOR CERAMIC COMPOSITION AND BARIUM TITANATE-BASED SEMICONDUCTOR CERAMIC DEVICE

This is a continuation of application Serial No. PCT/JP2010/059432, filed Jun. 3, 2010, the entire contents of which are incorporated herein by reference.

TECHNICAL FIELD

The present invention relates to barium titanate-based semiconductor ceramic compositions and barium titanate-based semiconductor ceramic devices. The present invention particularly relates to a barium titanate-based semiconductor ceramic composition and barium titanate-based semiconductor ceramic device having a positive temperature coefficient of resistance.

BACKGROUND ART

Barium titanate-based semiconductor materials are widely known as semiconductor ceramic materials with a positive temperature coefficient of resistance. Such semiconductor materials sharply increase in resistance at temperatures not lower than their Curie temperatures, that is, such semiconductor materials feature a PTC (positive temperature coefficient of resistance) and therefore are used for constant-temperature heaters, temperature sensors, and PTC thermistors for overcurrent protection.

Patent Literature 1 discloses a barium titanate-based semiconductor ceramic composition represented by the formula $(Ba_{(1-v-w)}Sr_vEr_w)Ti_xO_3 + yMn + zSiO_2$, wherein v is 0.05 mol to 0.40 mol, w is 0.005 mol to 0.012 mol, x is 1.00 mol to 1.04 mol, y is 0.0004 mol to 0.0018 mol, and z is 0.01 mol to 0.04 mol.

As described in Patent Literature 1, a barium titanate-based semiconductor ceramic composition having low resistivity at room temperature, a large temperature coefficient of resistance, and high breakdown voltage is obtained.

CITATION LIST

Patent Literature

PTL 1: Japanese Unexamined Patent Application Publication No. 51-38091

SUMMARY OF INVENTION

Technical Problem

Barium titanate-based semiconductor ceramic compositions need to have such a characteristic (hereinafter referred to as a linear characteristic) that the resistance thereof varies linearly with temperature so as to be usable for PTC thermistors for temperature sensors.

However, the barium titanate-based semiconductor ceramic composition disclosed in Patent Literature 1 has the characteristic that the resistance thereof sharply increases at about 60° C. Therefore, it is not suitable to use this barium titanate-based semiconductor ceramic composition for PTC thermistors for temperature sensors in a wide low-temperature range, for example, −30° C. to 80° C.

Accordingly, it is an object of the present invention to provide a barium titanate-based semiconductor ceramic composition which can be used for PTC thermistors for temperature sensors and which has characteristics, including a linear characteristic, advantageous for such PTC thermistors.

Solution to Problem

In order to solve the above problem, the present invention provides a barium titanate-based semiconductor ceramic composition represented by the formula $(Ba_{(1-v-w)}Me_vSr_w)Ti_xO_3 + ySiO_2$, wherein Me is at least one of Er, Sm, Ce, and La, and v, w, x, and y are within the ranges given by the inequalities $0.001 \leq v \leq 0.005$, $0.42 \leq w \leq 0.49$, $0.99 \leq x \leq 1.03$, and $0.002 \leq y \leq 0.030$, respectively.

In the barium titanate-based semiconductor ceramic composition, v is preferably within the range given by the inequality $0.001 \leq v \leq 0.002$.

A barium titanate-based semiconductor ceramic device according to the present invention contains the barium titanate-based semiconductor ceramic composition.

Advantageous Effects of Invention

A barium titanate-based semiconductor ceramic composition according to the present invention can exhibit a linear characteristic over a wide low-temperature range, for example, −30° C. to 80° C.; has characteristics, such as low specific resistance (resistivity) at room temperature and a large temperature coefficient of resistance, advantageous for PTC thermistors; and can achieve an effect that the rate of change in specific resistance (the rate of change in resistivity) is small after being left at a room temperature of 25° C. for 1,000 hours.

BRIEF DESCRIPTION OF DRAWINGS

FIG. 1 is a sectional view of a positive temperature coefficient thermistor 1 according to an embodiment of the present invention.

DESCRIPTION OF EMBODIMENTS

Preferred embodiments of the present invention will now be described. FIG. 1 is a sectional view of a positive temperature coefficient thermistor 1 according to a first embodiment of the present invention.

With reference to FIG. 1, the PTC thermistor 1 includes electrodes 11 and 12 and a ceramic body 20 which is sandwiched between the electrodes 11 and 12 and which is made of a barium titanate-based semiconductor ceramic composition. The electrode 11 is disposed on a surface of the ceramic body 20 and the electrode 12 is disposed on another surface thereof.

In the positive temperature coefficient thermistor 1, the barium titanate-based semiconductor ceramic composition according to the present invention is represented by the formula $(Ba_{(1-v-w)}Me_vSr_w)Ti_xO_3 + ySiO_2$, wherein Me is at least one of Er, Sm, Ce, and La, and v, w, x, and y are within the ranges given by the inequalities $0.001 \leq v \leq 0.005$, $0.42 \leq w \leq 0.49$, $0.99 \leq x \leq 1.03$, and $0.002 \leq y \leq 0.030$, respectively.

With the above composition, a linear characteristic can be obtained in a wide low-temperature range, for example, −30° C. to 80° C. and characteristics advantageous for PTC thermistors can be maintained. In particular, the present invention is intended to stably exhibit a linear characteristic in such a manner that a relatively large amount of strontium is contained in a major component and the Curie temperature is shifted to lower temperature. However, when a relatively large amount of strontium is present, the rate of change in specific resistance is large after being left at a room temperature of 25° C. for 1,000 hours. In contrast, when each element is within the composition range of the present invention, the following thermistor can be achieved: a PTC thermistor which has a linear characteristic obtained in a wide low-temperature range, of −30° C. to 80° C., a small rate of change in specific resistance upon being left at a room temperature of 25° C. for 1,000 hours, a small specific resistance, and a large temperature coefficient of resistance. Grounds for ranges of numbers are described on the basis of experiments below.

The positive temperature coefficient thermistor 1 as shown in FIG. 1 has a disk shape and may also have a rectangular parallelepiped shape. The positive temperature coefficient thermistor is of a single-plate type as shown in FIG. 1 but may be a chip-type positive temperature coefficient thermistor which includes no internal electrode in the ceramic body 20, or a multilayer-type positive temperature coefficient thermistor which includes internal electrodes in the ceramic body 20.

The electrodes 11 and 12 are arranged on both principal surfaces of the ceramic body 20. The electrodes 11 and 12 may be made of a material capable of forming an ohmic contact with the ceramic body 20. For example, nickel, Monel, chromium, or a similar material can be used for the electrodes 11 and 12. The electrodes 11 and 12 may be formed by a process such as sputtering or may be formed in such a manner that an electrode paste is applied to nickel coatings and is then baked.

The present invention is further described in detail on the basis of experiments below.

Experiments

The following compositions were produced: barium titanate-based semiconductor ceramic compositions represented by the formula $(Ba_{(1-v-w)}Me_vSr_w)Ti_xO_3 + ySiO_2$, Me being at least one selected from the group consisting of Er, Sm, Ce, and La. Semiconductor ceramic devices were manufactured using the compositions and were measured for temperature characteristic, specific resistance at room temperature, temperature coefficient of resistance, rate of change in specific resistance after being left at room temperature for 1,000 hours, and the rate of adhesion of calcined devices.

In order to produce the barium titanate-based semiconductor ceramic compositions, $BaCO_3$, $TiO_2$, $SrCO_3$, $CaCO_3$, $Er_2O_3$, and $SiO_2$ were prepared. These materials were blended as shown in Table 1 such that the barium titanate-based semiconductor ceramic compositions were obtained.

The blended materials were mixed with pure water, a dispersant, and zirconia balls for two hours and were pulverized, followed by drying and calcination at 1,200° C. for two hours. After calcination, the obtained calcined materials were mixed with pure water, a binder, and cobblestones for five hours, whereby slurry was prepared. The slurry was dried, and was then granulated, followed by the preparation of a disk-shaped pellet having a diameter of 12 mm and a thickness of 1 mm. The pellet was heated at a rate of 4° C./min and was calcined at 1,380° C. for two hours. After calcination, electrodes were formed on surfaces of the obtained device by sputtering Cr—Ni and Cu—Ag. The device was measured for specific resistance (resistivity) ρ at a room temperature of 25° C., temperature coefficients of resistance α, and rate of change in specific resistance (rate of change in resistivity) after being left at a room temperature of 25° C. for 1,000 hours, and linear coefficient representing a linear characteristic at a temperature of −30° C. to 25° C., a temperature of 25° C. to 85° C., and a temperature of −30° C. to 85° C.

The specific resistance (resistivity) ρ was determined in such a manner that the resistance (R25″) in a bath was measured at a room temperature of 25° C. by a pseudo-four-terminal technique and the specific resistance was calculated using the formula R25″×(electrode area/thickness of ceramic body).

The temperature coefficient of resistance (α) was determined using the following equation:

$$\alpha = \{\ln(R_{85}/R_{-30})/(T_2-T_1)\} \times 100 (\%/°C.)$$

wherein $R_{85}$ is the resistance at 85° C.,
$R_{-30}$ is the resistance at −30° C.,
$T_2$ is 85° C.,
and $T_1$ is −30° C.

The rate of change in specific resistance (the rate of change in resistivity) after being left at room temperature for 1,000 hours was determined in such a manner that the room-temperature resistance (R25) was measured at a room temperature of 25° C., and the room-temperature resistance (R25′) was measured after being left at room temperature for 1,000 hours, and the rate of change in resistance was determined using the following equation:

$$\Delta R25 = (R25'-R25)/(R25) \times 100 (\%/°C.).$$

The linear characteristic was determined in such a manner that the linear coefficient of each of 20 points measured at temperatures (R−30 to 85° C., R−30 to 25° C., and R 25 to 85° C.) was calculated using measurements obtained by measuring the resistance (R−30) at −30° C., the resistance (R25) at 25° C., and the resistance (R85) at 85° C. The linear coefficient $R^2$ is determined using Equation 1 below and represents the linearity of the temperature coefficient of resistance. That is, the closer to 1 that the absolute value of $R^2$ is, the better is linearity of the temperature coefficient of resistance.

$$R^2 = \frac{S(xy)^2}{S(xx)S(yy)} \quad \text{Equation 1}$$

$$S(xx) = \sum (x_i - \bar{x})^2$$

$$S(yy) = \sum (y_i - \bar{y})^2$$

$$S(xy) = \sum (x_i - \bar{x})(y_i - \bar{y})$$

x = temperature
y = ln (resistance at temperature x)

A sample having a specific resistance of 1.2 kΩ·cm or less, a temperature coefficient of resistance of 2.5%/° C. or more, a rate of change in specific resistance of 3% or less after being left at room temperature for 1,000 hours, and a linear coefficient of 0.98 or more was rated good. Asterisked sample numbers are outside the scope of the present invention. Table 1 shows the composition of each sample number. Table 2 shows measurement results.

TABLE 1

| Sample Number | Sr w (mol) | Ca w (mol) | Pb w (mol) | Me Species | v (mol) | Ti α (mol) | SiO₂ y (mol) | Mn z (mol) |
|---|---|---|---|---|---|---|---|---|
| *1 | 0.45 | 0.00 | 0.00 | Er | 0.0003 | 1.01 | 0.020 | 0.0000 |
| 2 | 0.45 | 0.00 | 0.00 | Er | 0.0010 | 1.01 | 0.020 | 0.0000 |
| 3 | 0.45 | 0.00 | 0.00 | Er | 0.0020 | 1.01 | 0.020 | 0.0000 |
| 4 | 0.45 | 0.00 | 0.00 | Er | 0.0030 | 1.01 | 0.020 | 0.0000 |
| 5 | 0.45 | 0.00 | 0.00 | Er | 0.0040 | 1.01 | 0.020 | 0.0000 |
| 6 | 0.45 | 0.00 | 0.00 | Er | 0.0050 | 1.01 | 0.020 | 0.0000 |
| *7 | 0.45 | 0.00 | 0.00 | Er | 0.0060 | 1.01 | 0.020 | 0.0000 |
| *8 | 0.40 | 0.00 | 0.00 | Er | 0.0025 | 1.01 | 0.010 | 0.0000 |
| 9 | 0.42 | 0.00 | 0.00 | Er | 0.0025 | 1.01 | 0.010 | 0.0000 |
| 10 | 0.45 | 0.00 | 0.00 | Er | 0.0025 | 1.01 | 0.010 | 0.0000 |

TABLE 1-continued

| Sample Number | Sr w (mol) | Ca w (mol) | Pb w (mol) | Me Species | v (mol) | Ti α (mol) | SiO$_2$ y (mol) | Mn z (mol) |
|---|---|---|---|---|---|---|---|---|
| 11 | 0.45 | 0.00 | 0.00 | Sm | 0.0025 | 1.01 | 0.010 | 0.0000 |
| 12 | 0.45 | 0.00 | 0.00 | Ce | 0.0025 | 1.01 | 0.010 | 0.0000 |
| 13 | 0.45 | 0.00 | 0.00 | La | 0.0025 | 1.01 | 0.010 | 0.0000 |
| 14 | 0.49 | 0.00 | 0.00 | Er | 0.0025 | 1.01 | 0.010 | 0.0000 |
| *15 | 0.50 | 0.00 | 0.00 | Er | 0.0025 | 1.01 | 0.010 | 0.0000 |
| *16 | 0.45 | 0.15 | 0.00 | Er | 0.0030 | 1.01 | 0.020 | 0.0000 |
| *17 | 0.45 | 0.00 | 0.05 | Er | 0.0030 | 1.01 | 0.020 | 0.0000 |
| *18 | 0.45 | 0.00 | 0.00 | Er | 0.0030 | 1.01 | 0.001 | 0.0000 |
| 19 | 0.45 | 0.00 | 0.00 | Er | 0.0030 | 1.01 | 0.002 | 0.0000 |
| 20 | 0.45 | 0.00 | 0.00 | Er | 0.0030 | 1.01 | 0.005 | 0.0000 |
| 21 | 0.45 | 0.00 | 0.00 | Er | 0.0030 | 1.01 | 0.010 | 0.0000 |
| 22 | 0.45 | 0.00 | 0.00 | Er | 0.0030 | 1.01 | 0.030 | 0.0000 |
| *23 | 0.45 | 0.00 | 0.00 | Er | 0.0030 | 1.01 | 0.040 | 0.0000 |
| *24 | 0.45 | 0.00 | 0.00 | Er | 0.0030 | 0.97 | 0.020 | 0.0000 |
| 25 | 0.45 | 0.00 | 0.00 | Er | 0.0030 | 0.99 | 0.020 | 0.0000 |
| 26 | 0.45 | 0.00 | 0.00 | Er | 0.0030 | 1.00 | 0.020 | 0.0000 |
| 27 | 0.45 | 0.00 | 0.00 | Er | 0.0030 | 1.02 | 0.020 | 0.0000 |
| 28 | 0.45 | 0.00 | 0.00 | Er | 0.0030 | 1.03 | 0.020 | 0.0000 |
| *29 | 0.45 | 0.00 | 0.00 | Er | 0.0030 | 1.05 | 0.020 | 0.0000 |
| *30 | 0.42 | 0.00 | 0.00 | Er | 0.0025 | 1.01 | 0.010 | 0.0001 |

*Asterisked samples are outside the scope of the present invention.

TABLE 2

| Sample Number | Specific resistance ρ (kΩ·cm) | Temperature coefficient of resistance α (%/°C.) | ΔR25 after being left at room temperature for 1,000 h (%) | R$^2$ at R−30 to 85° C. | R$^2$ at R−30 to 25° C. | R$^2$ at R25 to 85° C. |
|---|---|---|---|---|---|---|
| *1 | 1214 | — | — | — | — | — |
| 2 | 0.3 | 4.5 | 0.9 | 1.00 | 0.99 | 1.00 |
| 3 | 0.3 | 4.2 | 1.0 | 1.00 | 0.99 | 1.00 |
| 4 | 0.2 | 3.8 | 0.8 | 1.00 | 0.99 | 1.00 |
| 5 | 0.3 | 3.6 | 1.2 | 1.00 | 0.99 | 1.00 |
| 6 | 0.5 | 3.7 | 1.0 | 1.00 | 0.99 | 1.00 |
| *7 | 2.5 | — | — | — | — | — |
| *8 | 0.1 | 3.2 | 1.1 | 0.98 | 0.89 | 0.99 |
| 9 | 0.2 | 3.3 | 1.1 | 0.99 | 0.98 | 0.99 |
| 10 | 0.4 | 3.4 | 1.5 | 0.98 | 0.99 | 0.98 |
| 11 | 0.2 | 3.3 | 1.3 | 0.98 | 0.99 | 0.99 |
| 12 | 0.3 | 3.3 | 1.1 | 0.98 | 1.00 | 0.99 |
| 13 | 0.2 | 3.3 | 1.4 | 0.98 | 0.99 | 0.99 |
| 14 | 1.2 | 3.4 | 1.5 | 0.98 | 0.99 | 0.99 |
| *15 | 1.5 | 3.4 | 3.3 | 0.97 | 0.99 | 0.99 |
| *16 | 49 | 3.9 | — | 0.97 | 1.00 | 0.97 |
| *17 | 0.05 | 3.9 | — | 0.98 | 0.93 | 0.98 |
| *18 | — | — | — | — | — | — |
| 19 | 0.3 | 3.4 | 1.5 | 0.98 | 0.99 | 0.99 |
| 20 | 0.3 | 3.4 | 0.9 | 0.98 | 0.99 | 0.99 |
| 21 | 0.3 | 3.5 | 0.8 | 0.98 | 0.99 | 0.99 |
| 22 | 0.3 | 4.0 | 0.8 | 0.98 | 0.99 | 1.00 |
| *23 | 2.7 | — | — | — | — | — |
| *24 | 0.8 | 2.2 | — | — | — | — |
| 25 | 0.2 | 2.8 | 1.3 | 0.98 | 0.99 | 0.99 |
| 26 | 0.2 | 2.8 | 0.8 | 0.98 | 0.99 | 0.99 |
| 27 | 0.3 | 3.6 | 0.9 | 0.99 | 0.99 | 1.00 |
| 28 | 0.4 | 3.6 | 1.0 | 0.99 | 0.99 | 1.00 |
| *29 | 2.7 | — | — | — | — | — |
| *30 | 0.4 | 5.0 | 4.4 | — | — | — |

As shown in Table 1, Samples 2 to 6, 9 to 14, 19 to 22, and 25 to 28, which contain 0.42 mol to 0.49 mol Sr, 0.001 mol to 0.005 mol of a donor element represented by Me, 0.99 mol to 1.03 mol Ti, and 0.002 mol to 0.03 mol SiO$_2$, have a linear coefficient of 0.98 or more, a specific resistance of 1.2 kΩcm or less, a temperature coefficient of resistance of 2.5%/° C. or more, and a rate of change in specific resistance of 3% or less after being left at room temperature for 1,000 hours, and a sufficient linear characteristic. Excellent PTC characteristics are obtained.

In particular, Sample Numbers 2 and 3, which contain 0.001 mol to 0.002 mol Er, have a large temperature coefficient of resistance of 4.0%/° C. or more and therefore are more preferable. As seen in Sample Numbers 11 to 13 in Table 3, similar effects are obtained by replacing Er with Sm, Ce, or La.

For Sample Number 8, the amount of Sr is small, 0.40 mol; hence, an inflection point is present in the range of R−30 to 25° C., the linear coefficient is 0.89, and no sufficient linear characteristic is obtained. For Sample Number 15, the amount of Sr is large, 0.50 mol; hence, the specific resistance is high, 1.5 kΩ·cm, and the rate of change in specific resistance is high, 3.3%, after being left at room temperature for 1,000 hours.

For Sample Numbers 1 and 7, which contain 0.0003 mol Er and 0.006 mol Er, respectively, the specific resistance is high, 2.5 kΩ·cm or more. Since the specific resistance was high, the other characteristics were not evaluated.

For Sample Number 18, which contains 0.001 mol SiO$_2$, a barium titanate-based semiconductor ceramic composition used was not sintered and therefore the measurement of characteristics was impossible. For Sample Number 23, which contains 0.04 mol SiO$_2$, the specific resistance is high, 2.7 kΩ·cm or more. Because the specific resistance was high, other characteristics were not evaluated.

For Sample Number 24, which contains 0.97 mol Ti, the temperature coefficient of resistance is small, 2.2%/° C., and no desired PTC characteristics were obtained. Therefore, the other characteristics thereof were not evaluated.

For Sample Number 29, which contains 1.05 mol Ti, the specific resistance is high, 2.7 kΩ·cm. Since the specific resistance was high, the other characteristics were not evaluated.

For Sample Number 30, which contains 0.0001 mol Mn in addition to the present invention, the rate of change in specific resistance is high, 4.4% or more, after being left at room temperature for 1,000 hours. That is, the present invention prefers that no Mn is present. Because the rate of change in specific resistance was high after being left at room temperature for 1,000 hours, the other characteristics were not evaluated.

For Sample Number 16, which contains 0.15 mol Ca in addition to the present invention, the linear coefficient is 0.97 at R25 to 85° C. and the specific resistance is high, 49 kΩ·cm. That is, the present invention prefers that no Ca is present. This sample was not evaluated for rate of change in specific resistance after being left at room temperature for 1,000 hours because no linear characteristic was obtained.

For Sample Number 17, which contains 0.05 mol Pb in addition to the present invention, an inflection point is present in the range of R−30 to 25° C., the linear coefficient is 0.93, and no sufficient linear characteristic is obtained. This is probably because Pb acts to shift the Curie temperature to higher temperature. That is, the present invention prefers that no Pb is contained. This sample was not evaluated for rate of change in specific resistance after being left at room temperature for 1,000 hours because no linear characteristic was obtained.

REFERENCE SIGNS LIST

1 PTC thermistor
11 electrode
12 electrode
20 ceramic body

The invention claimed is:

1. A barium titanate-based semiconductor ceramic composition represented by the formula $$(Ba_{(1-v-w)}Me_vSr_w)Ti_xO_3 + ySiO_2$$

wherein Me is at least one member selected from the group consisting of Er, Sm, Ce, and La, $0.001 \leq v \leq 0.005$, $0.42 \leq w \leq 0.49$, $0.99 \leq x \leq 1.03$, and $0.002 \leq y \leq 0.030$.

2. A barium titanate-based semiconductor ceramic device containing the barium titanate-based semiconductor ceramic composition according to claim 1.

3. The barium titanate-based semiconductor ceramic composition according to claim 1, wherein $0.001 \leq v \leq 0.002$.

4. A barium titanate-based semiconductor ceramic device containing the barium titanate-based semiconductor ceramic composition according to claim 3.

5. The barium titanate-based semiconductor ceramic composition according to claim 3, wherein no Mn, Ca or Pb is present.

6. A barium titanate-based semiconductor ceramic device containing the barium titanate-based semiconductor ceramic composition according to claim 5.

7. The barium titanate-based semiconductor ceramic composition according to claim 5, wherein Me is Er.

8. A barium titanate-based semiconductor ceramic device containing the barium titanate-based semiconductor ceramic composition according to claim 7.

9. The barium titanate-based semiconductor ceramic composition according to claim 1, wherein Me is Er.

10. A barium titanate-based semiconductor ceramic device containing the barium titanate-based semiconductor ceramic composition according to claim 9.

11. The barium titanate-based semiconductor ceramic composition according to claim 1, wherein Me is Sm.

12. A barium titanate-based semiconductor ceramic device containing the barium titanate-based semiconductor ceramic composition according to claim 11.

13. The barium titanate-based semiconductor ceramic composition according to claim 1, wherein Me is Ce.

14. A barium titanate-based semiconductor ceramic device containing the barium titanate-based semiconductor ceramic composition according to claim 13.

15. The barium titanate-based semiconductor ceramic composition according to claim 1, wherein Me is La.

16. A barium titanate-based semiconductor ceramic device containing the barium titanate-based semiconductor ceramic composition according to claim 15.

* * * * *